(12) United States Patent
Sakazume

(10) Patent No.: US 10,552,893 B2
(45) Date of Patent: Feb. 4, 2020

(54) ELECTRONIC TRANSACTION TERMINAL, ELECTRONIC TRANSACTION METHOD, RECORDING MEDIUM AND PROGRAM

(71) Applicant: Rakuten, Inc., Tokyo (JP)

(72) Inventor: Tomoaki Sakazume, Tokyo (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 374 days.

(21) Appl. No.: 15/529,002

(22) PCT Filed: Nov. 27, 2014

(86) PCT No.: PCT/JP2014/081406
§ 371 (c)(1),
(2) Date: May 23, 2017

(87) PCT Pub. No.: WO2016/084196
PCT Pub. Date: Jun. 2, 2016

(65) Prior Publication Data
US 2017/0337617 A1    Nov. 23, 2017

(51) Int. Cl.
*G06Q 30/06* (2012.01)
*G06Q 20/20* (2012.01)

(52) U.S. Cl.
CPC ......... *G06Q 30/0633* (2013.01); *G06Q 20/20* (2013.01); *G06Q 30/0603* (2013.01);
(Continued)

(58) Field of Classification Search
None
See application file for complete search history.

(56) References Cited

U.S. PATENT DOCUMENTS 6,922,815 B2 * 7/2005 Rosen ............... G06F 16/954
715/782
7,953,642 B2 * 5/2011 Dierks ............... G06Q 20/102
705/26.1
(Continued)

FOREIGN PATENT DOCUMENTS

JP    2013101421 A  *  5/2013
JP       5475200 B1     4/2014

OTHER PUBLICATIONS

Anon, "Netgrocer.com Announces Johnson's(R) Baby to Sell Its Products On-Line At www.yourbaby.com to Simplify Moms' Shopping Trips," PR Newswire, Oct. 10, 2000. (Year: 2000).*
(Continued)

*Primary Examiner* — Nicholas D Rosen
(74) *Attorney, Agent, or Firm* — Sughrue Mion, PLLC

(57) ABSTRACT

In an electronic transaction terminal (20), a presenter (601) presents to a customer a product page including a product and an insertion object associated with the product. A receiver (602) receives an instruction from the customer. When an instruction selecting the insertion object associated with the product is received, an inserter (603) inserts the selected product into an electronic cart of the customer. When the product is inserted into the electronic cart, if a transition condition is satisfied, the presenter (601) causes the screen to transition from the product page to a purchase page that starts payment for purchasing products already inserted into the electronic cart. If the transition condition is not satisfied, the presenter (601) presents, along with the product page, an insertion notification indicating that the product shown on the product page was inserted into the electronic cart, and after waiting until an instruction selecting another product is received, causes the screen to tran-
(Continued)

sition from the product page to a product page showing the selected other product.

10 Claims, 12 Drawing Sheets

(52) U.S. Cl.
CPC ..... *G06Q 30/0635* (2013.01); *G06Q 30/0641* (2013.01); *G06Q 30/0601* (2013.01)

(56) References Cited

U.S. PATENT DOCUMENTS

| | | | | |
|---|---|---|---|---|
| 8,630,913 | B1* | 1/2014 | Lawrence | G06Q 30/0633 705/26.1 |
| 9,123,069 | B1* | 9/2015 | Haynes | G06Q 30/0625 |
| 2002/0135538 | A1* | 9/2002 | Rosen | G06F 16/954 345/1.1 |
| 2007/0225863 | A1* | 9/2007 | Gross | G06Q 10/087 700/266 |
| 2008/0183593 | A1* | 7/2008 | Dierks | G06Q 20/102 705/26.35 |
| 2012/0166268 | A1* | 6/2012 | Griffiths | G06Q 30/0222 705/14.23 |
| 2014/0222616 | A1* | 8/2014 | Siemiatkowski | G06Q 20/12 705/26.8 |
| 2015/0052062 | A1* | 2/2015 | Flomin | G06O 30/0633 705/71 |
| 2016/0019628 | A1* | 1/2016 | Udumudi | G06Q 30/0633 705/26.8 |
| 2016/0078522 | A1 | 3/2016 | Sakazume | |

OTHER PUBLICATIONS

English abstract of Nakanishi's Japanese Patent Application 2013-101421 A, May 23, 2013. (Year: 2013).*

* cited by examiner

FIG. 3

| PRODUCT CODE | PRODUCT NAME | INVENTORY COUNT | UNIT PRICE |
|---|---|---|---|
| 23456 | ○○ COLD MEDICINE | 500 | ¥1000 |
| 23789 | XX STOMACH MEDICINE | 1000 | ¥1500 |
| 98765 | MINERAL WATER, 2 LITER, 6 BOTTLES | 200 | ¥600 |
| 98799 | HOKKAIDO-GROWN WHITE RICE, 10KG | 100 | ¥3980 |
| ... | ... | ... | ... |

| CUSTOMER ID | DATE, TIME | PRODUCT CODE | NUMBER | PAYMENT |
|---|---|---|---|---|
| abc@xxx.yyy.jp | 2014/9/28 12:30:45 | 12345 | 1 | CARD, PAID |
| abc@xxx.yyy.jp | 2014/10/1 12:41:27 | 20001 | 1 | CARD, PAID |
| zyx@aaa.bbb | 2014/10/5 23:55:10 | 59876 | 1 | BANK TRANSFER, WAITING |
| ... | ... | ... | ... | ... |

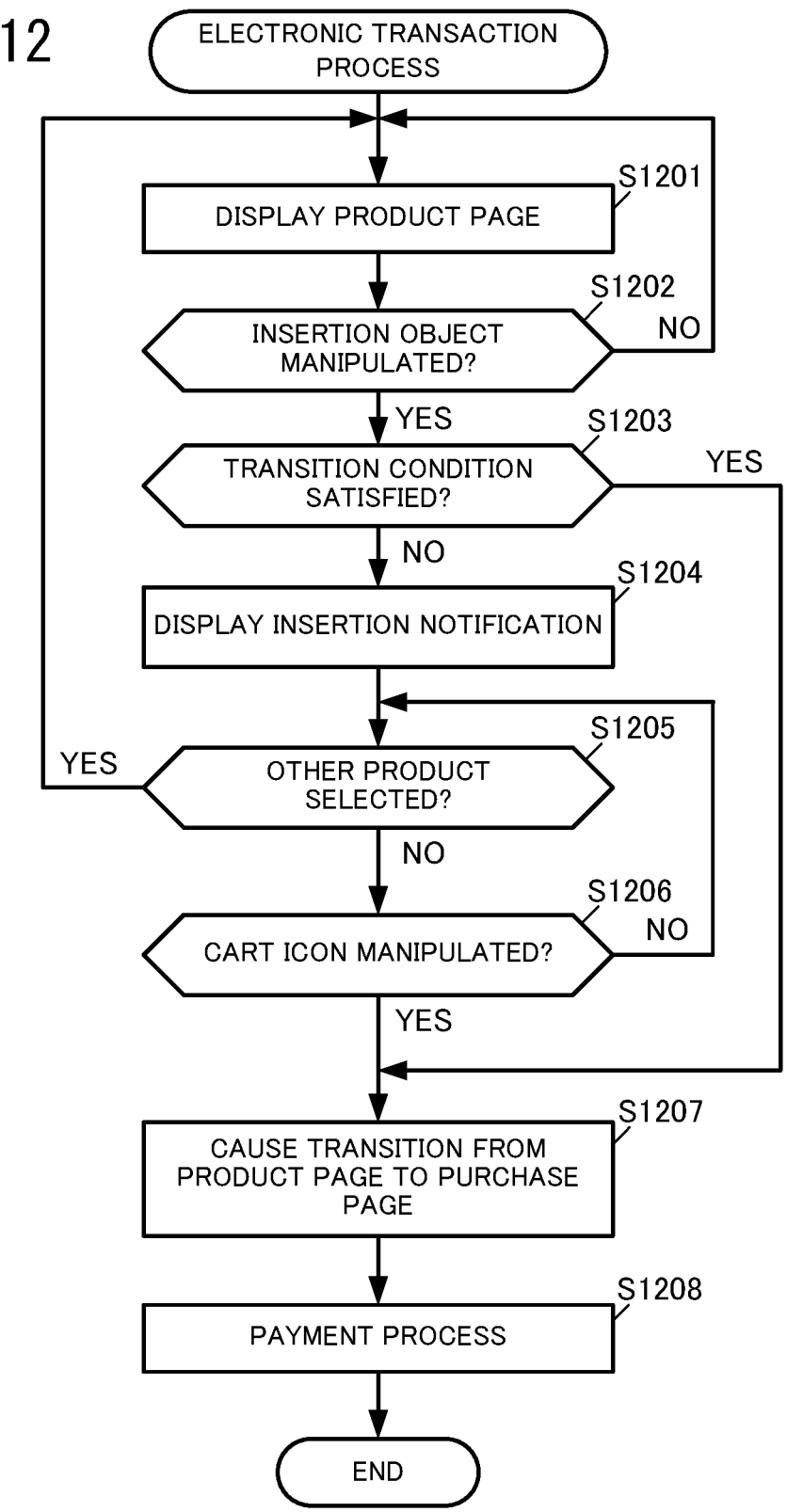

ELECTRONIC TRANSACTION TERMINAL, ELECTRONIC TRANSACTION METHOD, RECORDING MEDIUM AND PROGRAM

CROSS REFERENCE TO RELATED APPLICATIONS

This application is a National Stage of International Application No. PCT/JP2014/081406 filed Nov. 27, 2014, the contents of all of which are incorporated herein by reference in their entirety.

TECHNICAL FIELD

The present disclosure relates to an electronic transaction terminal, electronic transaction method, recording medium and program suitable for realizing an environment in which customers can easily shop.

BACKGROUND ART

Virtual electronic shopping malls operated on the Internet are proliferating. Customers can access the website of an electronic shopping mall using a personal computer, a mobile telephone and/or the like, and can browse various products and services offered on the electronic shopping mall. Furthermore, customers can add a product or service they like to a purchase list and can purchase such. The purchase list is generally called an electronic cart, a shopping basket and/or the like.

Patent Literature 1 discloses a browsing device used in accessing an electronic shopping mall, the browsing device being able to stimulate a customer's interest in purchasing a product and promote product purchases by appropriately giving notifications accompanying information for which browsing was requested from the customer. With such a browsing device, when there are products the customer places in the purchase list but leaves unpurchased, a popup image expressing the purchase list is displayed if a prescribed start condition is satisfied.

CITATION LIST

Patent Literature

Patent Literature 1: Japanese Patent No. 5475200.

SUMMARY OF INVENTION

Technical Problem

However, in order to purchase a single product, in general a customer must first search for the product, cause a product page showing the product to be displayed, register the product in the purchase list, then cause a purchase page for payments to be displayed and make a payment. When a customer is purchasing multiple products together, it is necessary to repeat the procedure of searching for the first product and registering it in the purchase list, then searching for the second product and registering it in the purchase list, then searching for the third product and registering it in the purchase list.

If there is only one product the customer is purchasing, the necessity of the customer going through the trouble of giving instructions causing the purchase page to be display disappears, and the customer can shop more smoothly. On the other hand, if there are multiple products the customer is purchasing, when the system automatically and instantly transitions to the purchase page after a product has been registered in the purchase list, the customer must again return to the product page, which can be exceedingly bothersome.

In this manner, there is a problem in that when the specifications of the system are uniformly decided so that the purchase page is transitioned to automatically and instantly after a product is registered in the purchase list, or the purchase page is not transitioned to automatically even when a product is registered in the purchase list, the customer's convenience improves or deteriorates depending on the circumstances. Furthermore, an environment in which shopping can be done with as small a burden as possible placed on the customer is desired.

In consideration of the foregoing, it is an objective of the present disclosure to provide an electronic transaction terminal, electronic transaction method, recording medium and program suitable for realizing an environment in which customers can easily shop.

Solution to Problem

In order to achieve the above objective, an electronic transaction terminal according to a first aspect of the present disclosure comprises:

a presenter for presenting to a customer a product page on which products and insertion objects associated with the products are posted;

a receiver for receiving instructions from the customer; and an inserter for inserting, when a first instruction selecting a product associated with the insertion object is received, the selected product into an electronic cart of the customer;

wherein when the product is inserted into the electronic cart:

(a) if a transition condition is satisfied, the presenter causes the page that should be presented to the customer to transition from the product page to a purchase page starting payment for purchasing products already inserted into the electronic cart; and (b) if the transition condition is not satisfied, the presenter presents along with the product page an insertion notification indicating that the product displayed on the product page has been inserted into the electronic cart, and waits until a second instruction selecting a different product is received by the receiver, and then causes the page that should be presented to the customer to transition from the product page to a product page showing the selected other product.

It would be fine for the presenter to determine that the transition condition is satisfied if, out of the other products posted on the product page, the number or ratio of related products belonging to the same category as the product associated with the selected insertion object is large on the basis of a prescribed standard.

It would be fine for the presenter to determine that the transition condition is satisfied if the number of other products purchased in the past along with the product associated with the selected insertion object, or the frequency with which other products have been purchased along with the product associated with the selected insertion object, is small on the basis of a prescribed standard.

It would be fine for the presenter to determine that the transition condition is satisfied if a product inserted into the electronic cart is a designated product specified in advance by a vendor.

It would be fine for the insertion notification to be presented to the customer along with a purchase object.

When the purchase object is selected through the instruction received, it would be fine for the presenter to erase the display of the insertion notification and cause the page that should be presented to the customer to transition from the product page to the purchase page.

It would be fine for the presenter to erase the display of the insertion notification when a standard time has elapsed from the start of the display of the insertion notification.

It would be fine for the presenter to be such that when the product is inserted into the electronic cart in a state in which no products have been inserted into the electronic cart, the presenter displays the insertion notification with a first length of time as an upper limit, and when the product is inserted into the electronic cart in a state in which at least one product has been inserted into the electronic cart, the presenter displays the insertion notification with a second length of time that is shorter than the first time as an upper limit.

It would be fine for the presenter to set an upper limit of the length of time for displaying the notification that is shorter the larger the number of products that have been inserted into the electronic cart.

In order to achieve the above objective, an electronic transaction method according to another aspect of the present disclosure comprises:

a presentation step for presenting to a customer a product page on which products and insertion objects associated with the products are posted;

a reception step for receiving instructions from the customer; and an insertion step for inserting, when a first instruction selecting a product associated with the insertion object is received, the selected product into an electronic cart of the customer;

wherein when the product is inserted into the electronic cart:

(a) if a transition condition is satisfied, the presentation step causes the page that should be presented to the customer to transition from the product page to a purchase page starting payment for purchasing products already inserted into the electronic cart; and (b) if the transition condition is not satisfied, the presentation step presents along with the product page an insertion notification indicating that the product displayed on the product page has been inserted into the electronic cart, and waits until a second instruction selecting a different product is received in the reception step, and then causes the page that should be presented to the customer to transition from the product page to a product page showing the selected other product.

In order to achieve the above objective, a non-transitory computer-readable recording medium according to another aspect of the present disclosure causes a computer to function as:

a presenter for presenting to a customer a product page on which products and insertion objects associated with the products are posted;

a receiver for receiving instructions from the customer; and an inserter for inserting, when a first instruction selecting a product associated with the insertion object is received, the selected product into an electronic cart of the customer;

wherein when the product is inserted into the electronic cart:

(a) if a transition condition is satisfied, the presenter causes the page that should be presented to the customer to transition from the product page to a purchase page starting payment for purchasing products already inserted into the electronic cart; and (b) if the transition condition is not satisfied, the presenter presents along with the product page an insertion notification indicating that the product displayed on the product page has been inserted into the electronic cart, and waits until a second instruction selecting a different product is received by the receiver, and then causes the page that should be presented to the customer to transition from the product page to a product page showing the selected other product.

In order to achieve the above objective, a program according to another aspect of the present disclosure causes a computer to function as:

a presenter for presenting to a customer a product page on which products and insertion objects associated with the products are posted;

a receiver for receiving instructions from the customer; and an inserter for inserting, when a first instruction selecting a product associated with the insertion object is received, the selected product into an electronic cart of the customer;

wherein when the product is inserted into the electronic cart:

(a) if a transition condition is satisfied, the presenter causes the page that should be presented to the customer to transition from the product page to a purchase page starting payment for purchasing products already inserted into the electronic cart; and (b) if the transition condition is not satisfied, the presenter presents along with the product page an insertion notification indicating that the product displayed on the product page has been inserted into the electronic cart, and waits until a second instruction selecting a different product is received by the receiver, and then causes the page that should be presented to the customer to transition from the product page to a product page showing the selected other product.

The above-described program can be distributed and sold via a computer communication network, independent of the computer that executes program. In addition, the above-described recording medium can be a non-transitory recording medium and can be distributed and sold independent of a computer.

Advantageous Effects of Invention

With the present disclosure, it is possible to realize an environment in which a customer can easily shop.

BRIEF DESCRIPTION OF DRAWINGS

FIG. 3 is a drawing showing an exemplary configuration of product data recorded in a product database;

FIG. 4 is a drawing showing an exemplary configuration of purchase history data stored in a purchase history database;

FIG. 12 is a flowchart for describing an electronic transaction process.

DESCRIPTION OF EMBODIMENTS

An exemplary embodiment of the present disclosure will be described. The exemplary embodiment below is for explanatory purposes, and does not limit the scope of the present disclosure. Accordingly, one skilled in the art can utilize an exemplary embodiment replacing each element or all elements herein with equivalents thereto, but such exemplary embodiments are also to be construed as within the scope of the present disclosure.

Figure 1:
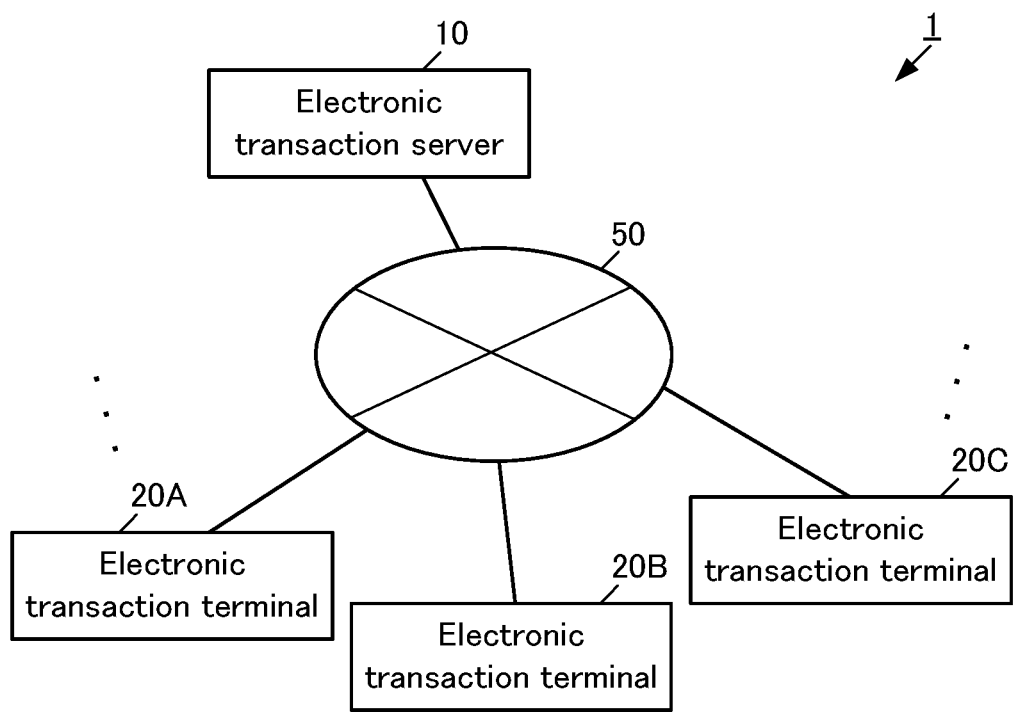
FIG. 1 is a drawing showing a summary configuration of an electronic transaction system.

First, a summary configuration of an electronic transaction system 1 according to the exemplary embodiment is described with reference to FIG. 1. The electronic transaction system 1 comprises an electronic transaction server 10, an electronic transaction terminal 20 (three store terminals 20A, 20B and 20C are shown in FIG. 1), and a communication network 50.

The electronic transaction server 10 manages a virtual electronic shopping mall on the Internet in which a plurality of stores participate. The electronic transaction server 10 is managed by a manager of the electronic shopping mall. The number of stores participating in the electronic shopping mall is arbitrary. Various products and services are sold in the electronic shopping mall.

In order to simplify the explanation, products and services sold in the electronic shopping mall will together be called "products." In the description below, services are included in products. Tangible items such as foodstuffs, apparel, consumer electronic goods and/or the like, as well as intangible items such as hotel reservations, online tickets, software usage licenses and/or the like, are included in products.

The electronic transaction server 10 stores product data including product codes identifying products, product names, product images, explanations relating to products, product inventory count, product unit prices, product sizes, product weights, shipping charges and/or the like. Contents of the product data differ for each product.

The product data is provided to the electronic transaction terminal 20 through a Web page accessible from the electronic transaction terminal 20. The Web page comprises HyperText Markup Language (HTML) data, image data, audio data and/or the like. The Web page need not be in HTML format, but may be in Extensible markup Language (XML) format, Extensible HyperText Markup Language (XHTML) format and/or the like. Or, the product data may be provided to the electronic transaction terminal 20 using a dedicated application installed on the electronic transaction terminal 20.

The electronic transaction terminal 20 is operated by a user purchasing products (hereafter called a "customer"). The customer accesses the electronic transaction server 10 by operating the electronic transaction terminal 20, browses pages containing product data (hereafter called "product pages") and applies for purchases of desired products.

The communication network 50 connects the electronic transaction server 10 and the electronic transaction terminal 20 so that communication is possible. The communication network 50 is typically the Internet, but may also include telephone circuits, dedicated circuits, a local area network (LAN), a wide area network (WAN) and/or the like.

Figure 2:
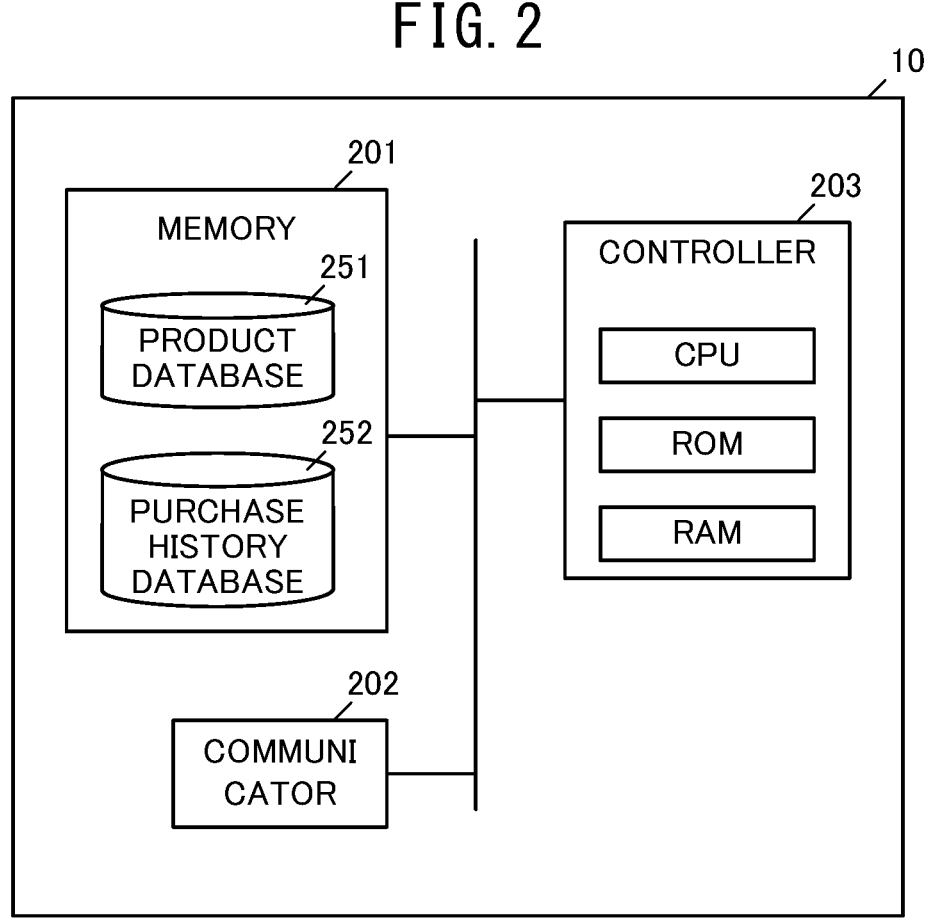
FIG. 2 is a drawing showing a hardware configuration of an electronic transaction server.

Next, a hardware configuration of the electronic transaction server 10 is described. As shown in FIG. 2, the electronic transaction server 10 comprises a memory 201, a communicator 202 and a controller 203.

The memory 201 comprises a memory device such as a hard disk and/or the like. A product database 251 is stored in the memory 201. The product database 251 stores product data about all products offered for sale in the electronic shopping mall.

FIG. 3 shows an exemplary configuration of product data recorded in the product database 251. In the product database 251, various data indicating product attributes such as product name, inventory count, unit price and/or the like are stored, associated with a product code that identifies the product. The product data can be updated at any time by a store terminal (unrepresented) operated by a responsible party of the store, or by the electronic transaction server 10.

In addition, a purchase history database 252 is stored in the memory 201. Data indicating products a customer has purchased in the past and data indicating products for which a customer has applied for purchase are stored in the purchase history database 252, associated with a customer ID identifying the customer. When a purchase application for a product is made from the electronic transaction terminal 20, the controller 203 adds to the purchase history database 252 a record indicating the fact that purchase of that product was applied for. The controller 203 updates at any time information indicating the payment status of the price of the product, the shipping statue of the product, and/or the like.

FIG. 4 shows an exemplary configuration of purchase history data stored in the purchase history database 252. In the purchase history database 252, data such as the date and time a product was purchased (or the date and time a purchase application was received), a product code indicating the purchased product, the number of products purchased, the price payment status and or the like, is stored, associated with a customer ID.

In this exemplary embodiment, an email address is used as the customer ID. However, any customer ID that can uniquely specify the customer may be used, and for example, it would be fine to use, in place of email address, a unique character string, numeric string or combination of these assigned to each customer.

The communicator 202 comprises a network interface card (NIC), connects the electronic transaction server 10 to the communication network 50, and communicates with the electronic transaction terminal 20.

The controller 203 comprises a central processing unit (CPU), read only memory (ROM), random access memory (RAM) and/or the like, and controls the electronic transaction server 10 as a whole.

As the electronic transaction server 10, it is possible to use a typical computer server, a mainframe, a cloud-type server, and/or the like.

Figure 5:
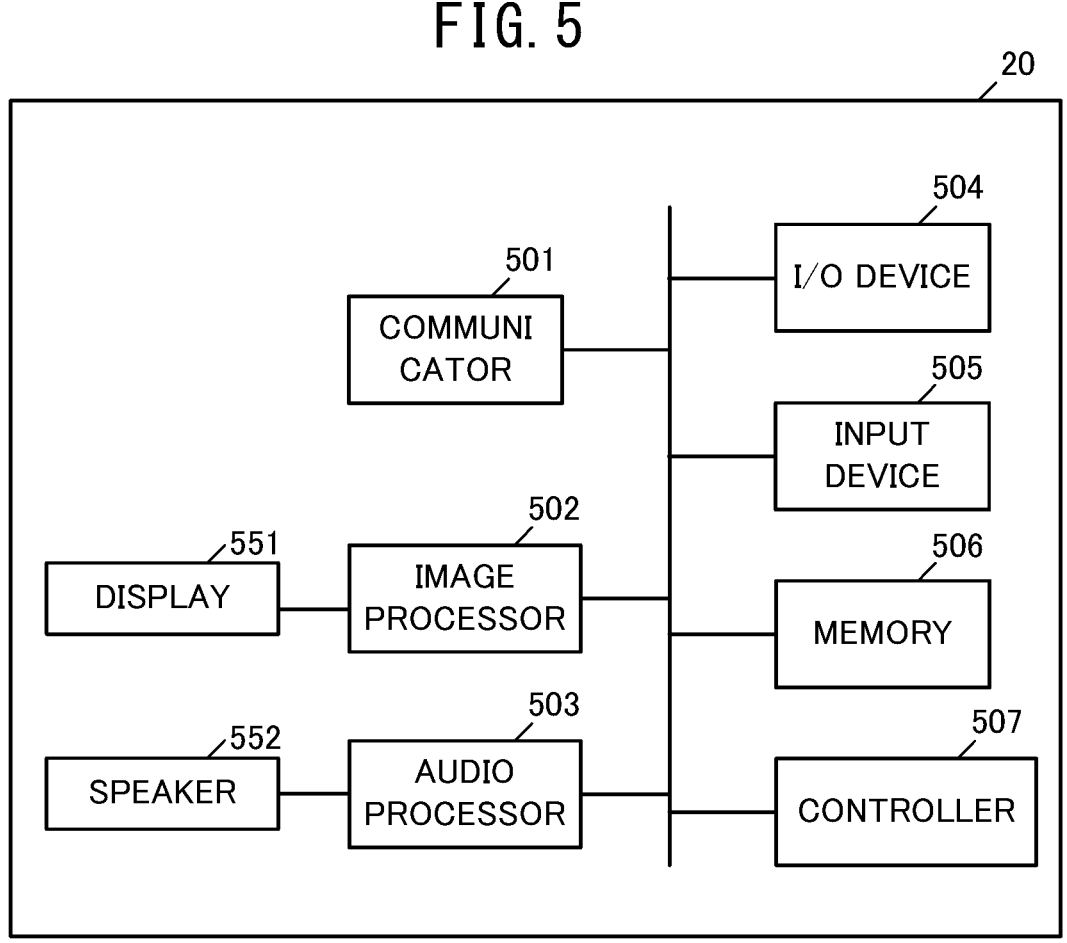
FIG. 5 is a drawing showing a hardware configuration of an electronic transaction terminal.

Next, the hardware configuration of the electronic transaction terminal 20 is described with reference to FIG. 5. The electronic transaction terminal 20 comprises a communicator 501, an image processor 502, an audio processor 503, an input/output (I/O) device 504, an input device 505, a memory 506 and a controller 507.

The communicator 501 comprises a NIC, connects the electronic transaction terminal 20 to the communication network 50 and communicates with the electronic transaction server 10.

The image processor 502 generates image data for displaying on a display 551, and displays the generated image data on the display 551. For example, the image processor 502 receives the above-described HTML data or image data comprising a product page including product data, HTML data or image data comprising a purchase page for receiving product purchases, and/or the like, from the electronic transaction server 10 via the communicator 501, and displays a screen giving product guidance, a screen receiving product purchases, and/or the like, on the display 551.

The audio processor 503 acquires audio data from the memory 506 or the electronic transaction server 10, reproduces this and outputs the audio from a speaker 552.

The I/O device 504 comprises an interface connecting a removable memory card to the electronic transaction terminal 20.

The input device 505 comprises an interface for receiving input from a customer. In this exemplary embodiment, the input device 505 comprises, besides a hardware button, a touch panel positioned superimposed on the display 551.

The memory 506 comprises a memory device such as a ROM, RAM and/or the like, and stores an operating system for controlling the electronic transaction terminal 20, various types of programs image data, audio data, text data and/or the like.

The controller 507 comprises a CPU and controls the electronic transaction terminal 20 as a whole.

As the electronic transaction terminal 20, it is possible to use a typical personal computer possessing communication functionality, a mobile phone handset, a smartphone, a mobile terminal, a tablet-type terminal and/or the like.

Next, a functional configuration of the electronic transaction terminal 20 according to this exemplary embodiment, and details of an electronic transaction process executed by the electronic transaction system 1, are described.

Figure 6:
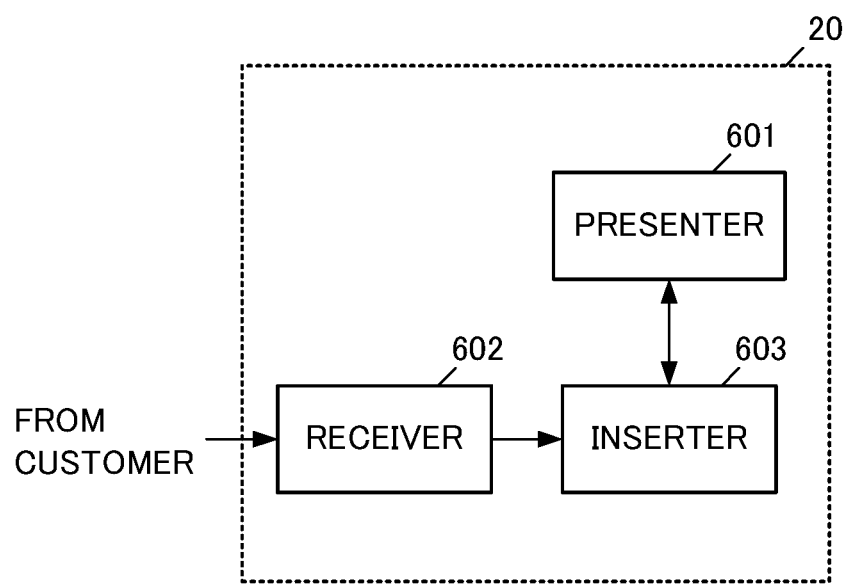
FIG. 6 is a drawing showing a functional configuration of the electronic transaction terminal.

FIG. 6 shows a functional configuration of the electronic transaction terminal 20. The electronic transaction terminal 20 comprises a presenter 601, a receiver 602 and an inserter 603.

The presenter 601 presents a product page on which information indicating the product and objects associated with the product are loaded, to the customer. In this exemplary embodiment, the presenter 601 presents information indicating the product to the customer by displaying the product page on the display 551. The image processor 502 and the controller 507, working together, function as the presenter 601.

More specifically, when a customer accesses the electronic shopping mall using the electronic transaction terminal 20, and inputs an instruction to cause a desired product page to be displayed, the controller 507 of the electronic transaction terminal 20 requests transmission of the designated product page from the electronic transmission server 10. The controller 203 of the electronic transmission server 10 acquires data comprising the requested product page from the memory 201 and transmits the data to the electronic transaction terminal 20. The controller 507 of the electronic transaction terminal 20 receives the data comprising the product page from the electronic transaction server 10, and displays the product data on the display 551.

Audio may be included in the product page. The controller 507 may not just display the product page on the display 551, but may also control the audio processor 503 and cause audio to be output, thereby exhibiting information showing the product to the customer.

Figure 7:
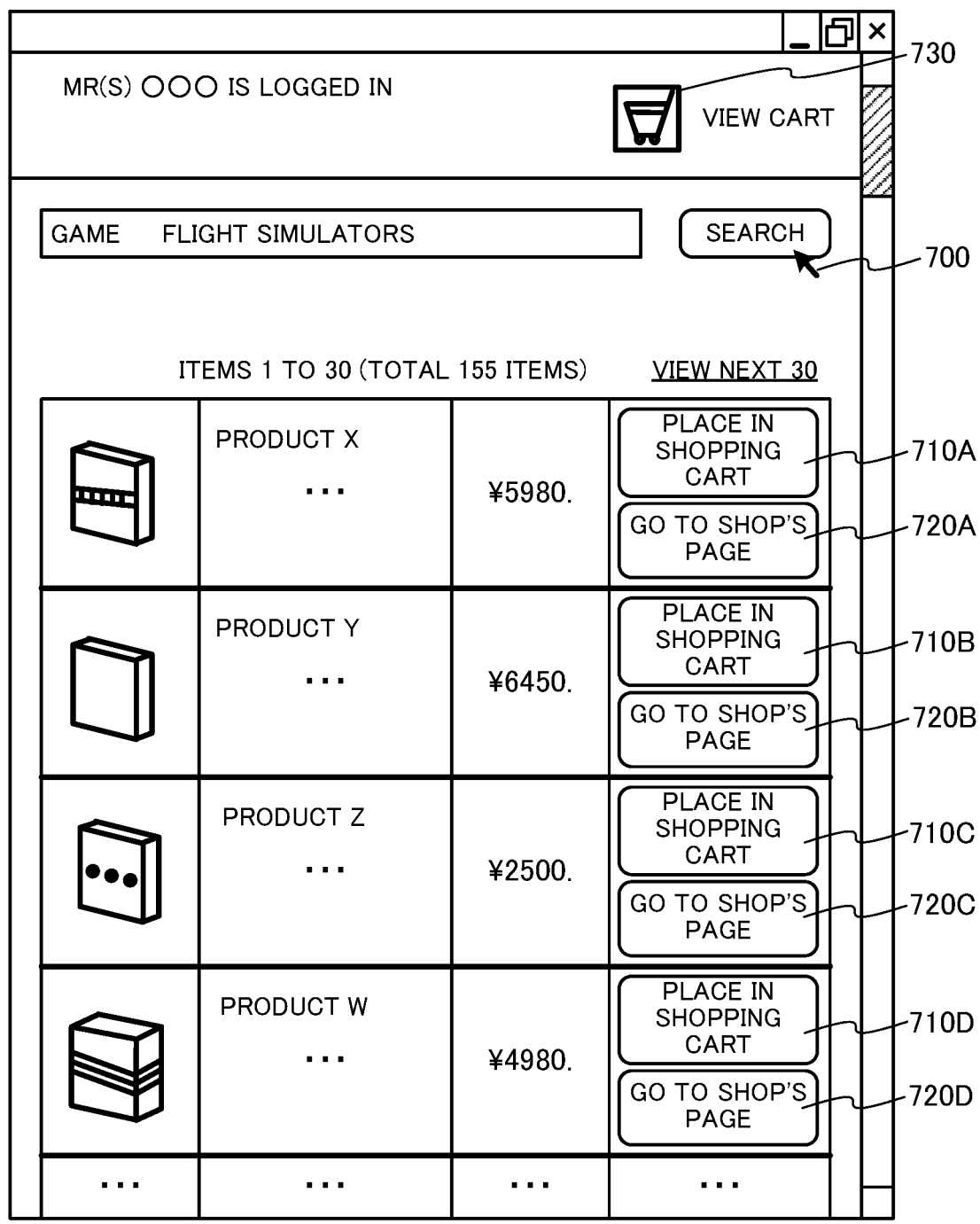
FIG. 7 is a drawing showing an example of a product page.

FIG. 7 shows an example of a product page. FIG. 7 shows a product page displaying the results of a customer inputting the two keyword phrases "game" and "flight simulator" in the electronic shopping mall and searching among all products sold in the electronic shopping mall. The product page includes, for each product, an image of the product, a description of the product, the sales price of the product, an insertion object 710 (710A, 710B, 710C and 710D in FIG. 7) and a store object 720 (720A, 720B, 720C and 720D in FIG. 7).

In this exemplary embodiment, the customer selects an object by moving a cursor 700 using a mouse, and clicking. When a click is done in a state with the cursor 700 positioned in the area where the insertion object 710 is displayed, the insertion object 710 is selected, and a process associated in advance with the insertion object 710 is executed by the electronic transaction terminal 20.

In order to simplify the explanation, the fact that a click is done in a state with the cursor 700 positioned in an area where an object is displayed will be expressed as "the object is manipulated" or "the object is selected." The customer can select an arbitrary object.

The input device 505 of the electronic transaction terminal 20 functions as the receiver 602 for receiving instructions from the customer.

In an exemplary embodiment in which the electronic transaction terminal 20 comprises a so-called touch screen with a touch panel positioned superimposed on the display surface of the display 551, if an area where an object is displayed is touched by the customer, that object is selected and a process associated in advance with the selected object is executed by the electronic transaction terminal 20.

The insertion object 710 is a software button that receives from the customer instructions to register a product in a list (hereafter called a "purchase list" or an "electronic cart") that temporarily stores information indicating products for which the customer is applying for purchase. When the insertion object 710 is manipulated by the customer, the controller 507 of the electronic transaction terminal 20 adds the product associated with the manipulated insertion object 710 to the purchase list.

More accurately, the controller 507 of the electronic transaction terminal 20 sends to the electronic transaction server 10 a request to add the product associated with the manipulated insertion object 710 to the purchase list, and the customer ID of the customer who manipulated the electronic transaction terminal 20. The controller 203 of the electronic transaction server 10 that received this request adds a record that stores the product code indicating the product associated with the manipulated insertion object 710, the number of products, the date and time the application for purchase was received, and/or the like, to the purchase list associated with the customer ID. The purchase list is stored in the memory 201, and can be updated at any time by the controller 203.

For example, in FIG. 7, when the insertion object 710A is manipulated by the customer, the controller 507 of the electronic transaction terminal 20 adds one of product X corresponding to the insertion object 710A to the purchase list.

Here, the way the screen transitions when the insertion object 710 is manipulated changes depending on conditions such as what other products are included within the same product page, or how many other products are included within the same product page, and/or the like, but this will be described in detail later.

When an instruction to select the object corresponding to the insertion object 710 (hereafter referred to as the "first instruction") is received by the receiver 602, the controller 507 of the electronic transaction terminal 20 functions as the inserter 603 for inserting the product corresponding to the selected insertion object 710 into the customer's purchase list.

The store object 720 is a software button for receiving from the customer an instruction causing the screen to transition to a page introducing a store selling the product. When the store object 720 is manipulated by the customer, the controller 507 of the electronic transaction terminal 20 sends to the electronic transaction server 10 a request that causes the screen to transition to a page associated in advance with the manipulated store object 720. The controller 203 of the electronic transaction server 10 that has received this request acquires from the memory 201 data comprising the requested page, and sends this data to the electronic transaction terminal 20. The controller 203 of the electronic transaction terminal 20 receives and displays the data comprising the requested page. A page introducing a store selling the product selected by the customer is displayed on the display 551.

A cart icon 730 is a software button that receives from the customer an instruction to display the purchase list. When the cart icon 730 is manipulated by the customer, the controller 507 of the electronic transaction terminal 20 requests of the electronic transaction server 10 transmission of a summary of products already registered in the purchase list associated with the customer ID. The controller 203 of the electronic transaction server 10 acquires data indicating the purchase list associated with the customer ID from the memory 201, and sends this data to the electronic transaction terminal 20. The controller 507 of the electronic transaction terminal 20 receives data indicating the purchase list from the electronic transaction server 10 and displays such.

Figure 8:
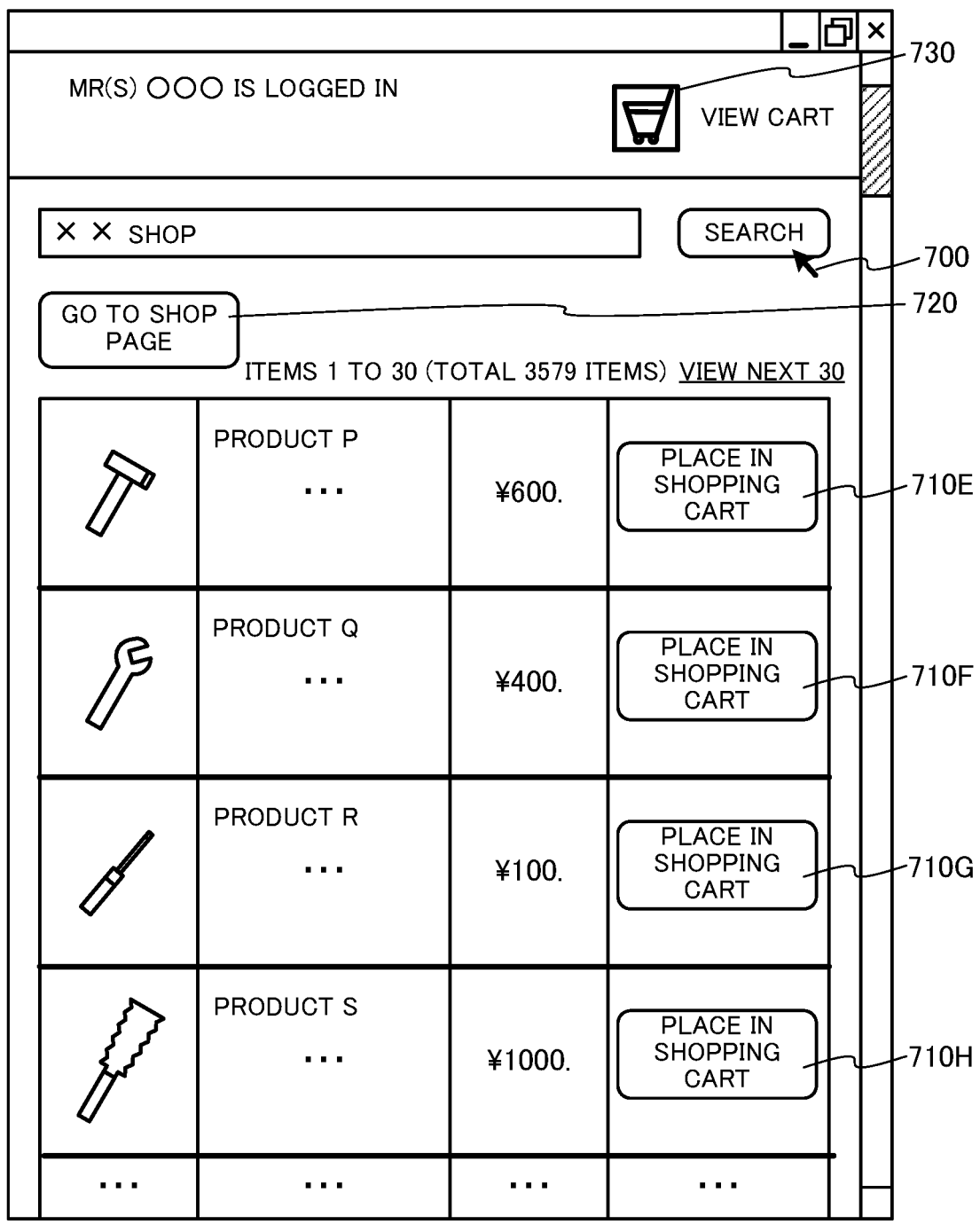
FIG. 8 is a drawing showing another example of a product page.

FIG. 8 shows another example of a product page. FIG. 8 shows a product page displayed as a result of a customer inputting a store name as a keyword in the electronic shopping mall and searching products sold by the store having that store name from among all products sold by the electronic shopping mall. On the product page, an image of the product, product description, a product sales price and an insertion object 710 (insertion objects 710E, 710F, 710G, 710H in FIG. 8) are displayed for each product. On the product page, product data relating to all products sold in the searched store is displayed.

When products are searched using store name, only products sold by the same store are included in the search results. The controller 507 of the electronic transaction terminal 20 may display a plurality of store objects 720A, 720B, 720C and 720D associated with the same store in association with each of the products, as shown in FIG. 7, but it would be fine to display a single store object, as shown in FIG. 8.

However, when a search is made using a product name or a category name as shown in FIG. 7, in general, a plurality of products sold by a plurality of stores are included in the search results. In addition, there is a high probability that a plurality of mutually competing products will be included in the search results. When two mutually competing products are sold by different stores, there is a relatively high risk to one of the stores that not its own product but a competing product sold by another store will be purchased by the customer, thereby missing out on a sales opportunity of its own.

In contrast, when a search is made using a store name as shown in FIG. 8, a plurality of products sold by the same store are included in the search results. Even if two mutually competing products are included in the search results, both products are sold by the same store, so to that store, there is relatively low risk of missing out on a sales opportunity.

Hence, if a predetermined transition condition is satisfied when the insertion object 710 is manipulated, the electronic transaction terminal 20 of this exemplary embodiment immediately causes the screen to transition to a purchase page that starts payment in order to purchase one or more products registered in the purchase list, thereby actively promoting a purchase by the customer. In contrast, if the predetermined transition condition is not satisfied when the insertion object 710 is manipulated, the electronic transaction terminal 20 does not immediately transition to the purchase page, but instead continues to display the product page, making it easy for the customer to purchase other products as well.

Figure 9:
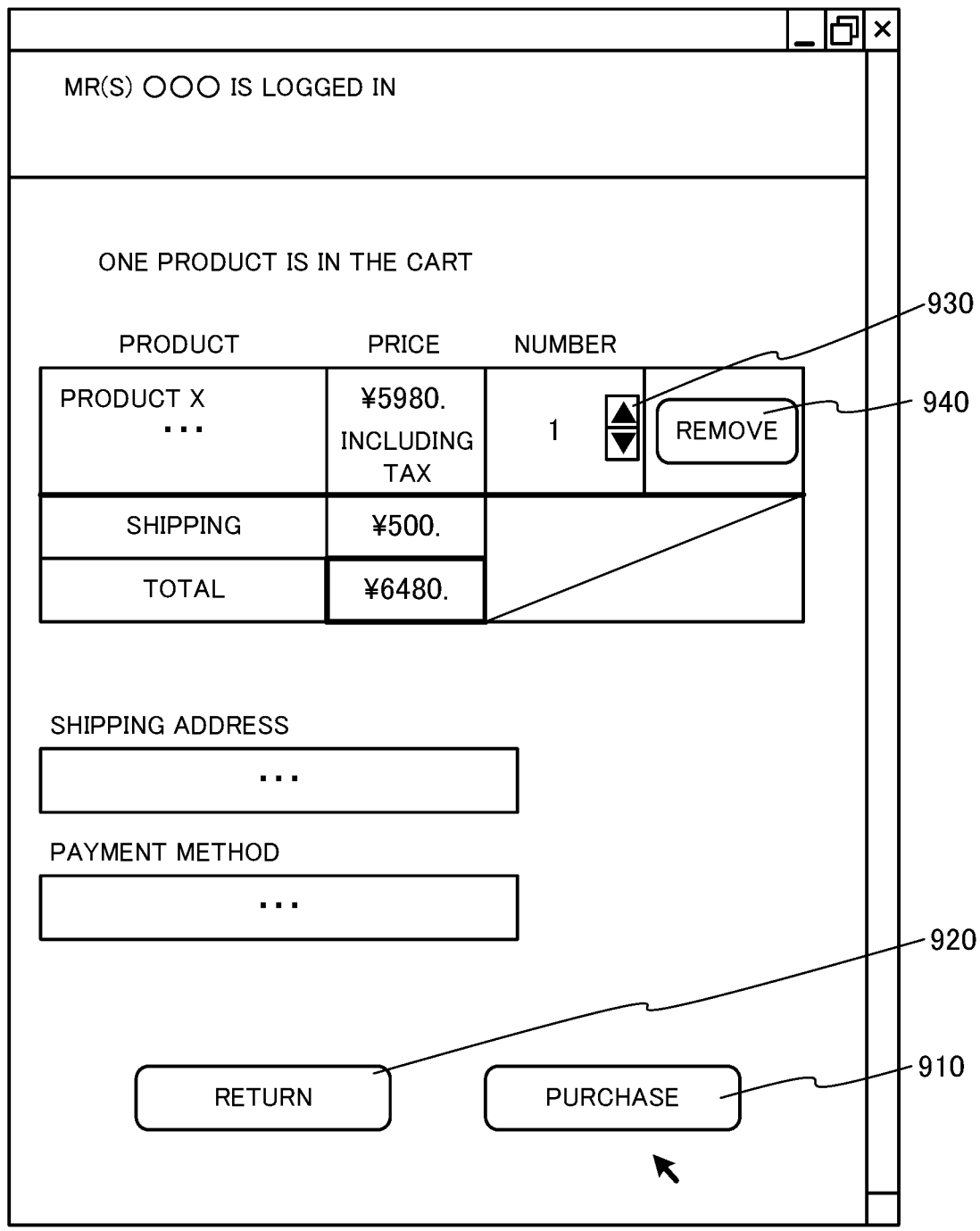
FIG. 9 is a drawing showing an example of a purchase page.

FIG. 9 shows an example of a purchase page. The purchase page includes a purchase object 910 for receiving an instruction to pay for the purchase of products registered in the purchase list, a button 920 for receiving an instruction to return to previous page, a button 930 for receiving an update to the number of items, and a button 940 for receiving an instruction to delete a product from the purchase list.

The controller 507 of the electronic transaction terminal 20 causes the screen to transition from the product page to the purchase page when (1) a predetermined transition condition is satisfied when the insertion object 710 is manipulated by the customer, or (2) when the cart icon 730 is manipulated by the customer.

When the purchase object 910 is manipulated by the customer, the controller 507 of the electronic transaction terminal 20 sends to the electronic transaction terminal 20 a request to start a payment process to pay the charge for the products registered in the purchase list. The controller 203 of the electronic transaction server 10 executes a payment process.

Specifically, the controller 507 of the electronic transaction terminal 20 sends to the electronic transaction server 10 a credit card number and/or the like input by the customer, and requests the start of payment by the electronic transaction server 10. The controller 203 of the electronic transaction server 10 requests payment of a payment server (unrepresented) of a credit card company, using the received credit card number and/or the like. The payment server, upon normally concluding payment, notifies the electronic transaction server 10 of that fact. The controller 203 of the electronic transaction server 10 notifies the electronic transaction terminal 20 that payment has concluded normally. The controller 203 of the electronic transaction server 10 notifies a terminal of the store selling the product that an order for the product has been decided. A responsible party at the store ships the product to the customer.

The controller 507 of the electronic transaction terminal 20 may also request payment from the payment server of the credit card company using a credit card number and/or the like registered in advance by the customer and recorded in the memory 506. In this case, it is possible to reduce opportunities for sending and receiving highly privileged information such as credit card numbers and/or the like between the electronic transaction terminal 20 and the electronic transaction server 10 with each payment.

The controller 203 of the electronic transaction server 10 may also generate and send to the electronic transaction terminal 20 a purchase page using information such as an address, name, telephone number, credit card information and/or the like registered in advance by the customer and stored in advance in the memory 201.

When the transition condition is satisfied, the electronic transaction terminal 20 immediately causes a transition from the product page to the purchase page when the first instruction selecting the product corresponding to the insertion object 710 is input, making it possible for the customer to promptly purchase products registered in the purchase list. Because the transition to the purchase page from the product page is made promptly after the insertion object 710 is manipulated, the customer does not need to go to the trouble of manipulating the cart icon 730.

The transition condition is that of all the products posted on the product page, the number or ratio of related products (competing products) belonging to the same category as the product associated with the manipulated insertion object 710, that is to say the product registered in the purchase list, is large based on a prescribed determination standard. When the controller 507 determines that the transition condition is satisfied, the transition is immediately made from the product page on which the manipulated insertion object 710 is displayed, to the purchase page for accomplishing procedures for purchasing the products registered in the purchase list.

That is to say, the controller 507 calculates a number $N_A$ of related products belonging to the same category as the product associated with the manipulated insertion object 710, out of all products posted on the product page. Furthermore, if the number $N_A$ is larger than a predetermined value (for example, 5 and/or the like), the controller 507 determines that the transition condition is satisfied. If the number of competing products is larger than the determination standard, a transition is immediately made from the product page to the purchase page, after the insertion object 710 is manipulated by the customer.

Or, the controller 507 calculates a number $N_A$ of related products belonging to the same category as the product associated with the manipulated insertion object 710, out of all products posted on the product page. In addition, the controller 507 calculates a number $N_B$ of all products posted on the product page. Then, the controller 507 determines that the transition condition is satisfied if a ratio $R_A$ of the number $N_A$ to the number $N_B$ is larger than a predetermined value (for example, 50% and/or the like). If the ratio of competing products out of all products is larger than the standard, the transition is immediately made from the product page to the purchase page after the insertion object 710 is manipulated by the customer.

The controller 507 of the electronic transaction terminal 20 may make the transition condition that the number or ratio of related products belonging to the same category as the product associated with the manipulated insertion object 710 is large based on a prescribed standard, out of all products sold in the electronic shopping mall, instead of being that the number or ratio of related products belonging to the same category as the product associated with the manipulated insertion object 710 is large based on a prescribed standard, out of all products posted on the product page.

The category is akin to a label having a hierarchical structure for classifying products. For example, in a first level at the very top, categories such as foodstuffs, consumer electronics, books, fashion and/or the like are defined. In a second level below the first level, subcategories such as beverages and candy under foodstuffs, and personal computers and audio equipment under consumer electronics, are defined. Furthermore, in a third level under the second level, subcategories such as soft drinks and alcohol under beverages are defined. The depth of the levels is arbitrary. If categories to which two products belong are the same, those two products are considered related products (competing products).

In this exemplary embodiment, products belonging to the lowest level of categories are considered related products. However, it would be fine to have being in the same category one up from the lowest level, or the category two up from the lowest level, and/or the like, instead of the lowest level, as a guideline for determining whether or not products are considered related products.

The transition condition may also be that the number of other products purchased in the past along with the product associated with the manipulated insertion object 710, or the frequency with which other products have been purchased in the past along with the product associated with the manipulated insertion object 710, is small based on a prescribed determination standard.

That is to say, the controller 507 of the electronic transaction terminal 20 seeks from the electronic transaction server 10 a number $N_C$ of other products purchased in the past along with the product associated with the manipulated insertion object 710. The controller 203 of the electronic transaction server 10 searches the purchase history database 252, acquires the number $N_C$, and sends information indicating the acquired number $N_C$ to the electronic transaction terminal 20.

For example, if product X has been purchased along with two other products once in the past, and has been purchased along with one other product twice in the past, then $N_C=4$ from Equation 1.

$$NC = 1 \times 2 + 2 \times 1 = 4 \qquad \text{[Equation 1]}$$

Then, the controller 507 of the electronic transaction terminal 20 determines that the transition condition is satisfied if the number $N_C$ is smaller than a predetermined value (for example, 10 and/or the like). If the number of products purchase together is smaller than the determination standard, the transition is immediately made from the product page to the purchase page after the insertion object 710 is manipulated by the customer.

Or, the controller 507 of the electronic transaction terminal 20 seeks from the electronic transaction server 10 a number $N_D$ of times the product associated with the manipulated insertion object 710 was purchased in the past, and a number $N_E$ of times the product associated with the manipulated insertion object 710 was purchased with another product in the past. The controller 203 of the electronic transaction server 10 searches the purchase history database 252 and acquires the numbers $N_D$ and $N_E$. The controller 203 of the electronic transaction server 10 calculates a ratio $R_B$ of the number $N_E$ to the number $N_D$, and sends information indicating the calculated ratio $R_B$ to the electronic transaction terminal 20. The controller 507 of the electronic transaction terminal 20 determines that the transition condition is satisfied if the ratio $R_B$ is smaller than a predetermined value (for example, 50% and/or the like). If the ratio of times the product was purchased with other products to the total number of transactions is smaller than the determination standard, the transition is immediately made from the product page to the purchase page after the insertion object 710 is manipulated by the customer.

In addition, the transition condition may be a designated product specified in advance by the seller of the product. When the designated product is registered in the purchase list, the transition is immediately made from the product page to the purchase page after the insertion object 710 is manipulated by the customer.

That is to say, the seller specifies in advance, for all products sold in the seller's store, whether or not a product is a designated product that when registered in the purchase list should cause a transition to the purchase page immediately from the product page. Or, the seller explicitly specifies in advance only designated products, and does not specify anything about products that are not designated products. The controller 203 of the electronic transaction server 10 stores a classification flag indicating whether or not a product is a designated product, in the memory 201 for all products. The controller 203 of the electronic transaction server 10 that has received a request to register a product in the purchase list determines whether or not the product for which the request for registration in the purchase list was made is a designated product, based on the value of the classification flag stored in the memory 201.

When the product for which a request for registration in the purchase list was made is a designated product, the controller 203 of the electronic transaction server 10 sends data comprising the purchase page to the electronic transaction terminal 20. The controller 507 of the electronic transaction terminal 20 determines that the transition condition is satisfied and causes the screen to transition from the product page to the purchase page.

When the product for which a request for registration in the purchase list was made is not a designated product, the controller 203 of the electronic transaction server 10 notifies the electronic transaction terminal 20 to continue with the display of the product page and that there will not be a transition to the purchase page. The controller 507 of the electronic transaction terminal 20 that has received this notification determines that the transition condition is not satisfied, and does not cause the screen to transition to the purchase page from the product page even when the insertion object 710 is manipulated.

In an electronic market in which a plurality of stores participate, such as the electronic shopping mall of this exemplary embodiment, in addition to the manager of each store (that is to say, the seller or merchant of the products) arbitrarily establishing designated products, or instead of the manager of each store arbitrarily establishing designated products, it would be fine for a manager of the electronic market as a whole (that is to say, the operator of the electronic market) to arbitrarily establish designated products.

That is to say, the controller 203 of the electronic transaction server 10 adds a field storing a classification flag indicating whether or not the product is a designated product, to each record of product data shown in FIG. 4, and updates the classification flag at any time on the basis of instructions from the manager of each store or based on instructions from the manager of the electronic market as a whole. When registration of a product in the purchase list is requested, the controller 203 of the electronic transaction server 10 references the classification flag associated with that product.

If a value indicating that the product is a designated product is stored in the classification flag, the controller 203 of the electronic transaction server 10 notifies the electronic transaction terminal 20 that the product for which registration in the purchase list was requested is a designated product. The controller 507 of the electronic transaction terminal 20 determines that the transition condition is satisfied.

If a value indicating that the product is a not designated product is stored in the classification flag, the controller 203 of the electronic transaction server 10 notifies the electronic transaction terminal 20 that the product for which registration in the purchase list was requested is a not designated product. The controller 507 of the electronic transaction terminal 20 determines that the transition condition is not satisfied.

It would also be fine to not define products for which a transition should immediately be made from the product page to the purchase page when registered in the purchase list as designated products but conversely to define products for which a transition should not immediately be made from the product page to the purchase page when registered in the purchase list as designated products. In this case, if a product for which a request for registration in the purchase list was made is a designated product, the controller 203 of the electronic transaction server 10 notifies the electronic transaction terminal 20 that the product for which a request for registration in the purchase list was made is a designated product, and the controller 507 of the electronic transaction terminal 20 determines that the transition condition is not satisfied. In addition, if a product for which a request for registration in the purchase list was made is not a designated product, the controller 203 of the electronic transaction server 10 notifies the electronic transaction terminal 20 that the product for which a request for registration in the purchase list was made is not a designated product, and the controller 507 of the electronic transaction terminal 20 determines that the transition condition is satisfied.

When the transition condition is not satisfied, the controller 507 of the electronic transaction terminal 20 continues to display the product page when the instruction (first instruction) to select the product associated with the insertion object 710 is input, and waits, displaying an insertion notification indicating that the product indicated on the product page was inserted into the purchase list.

Figure 10:
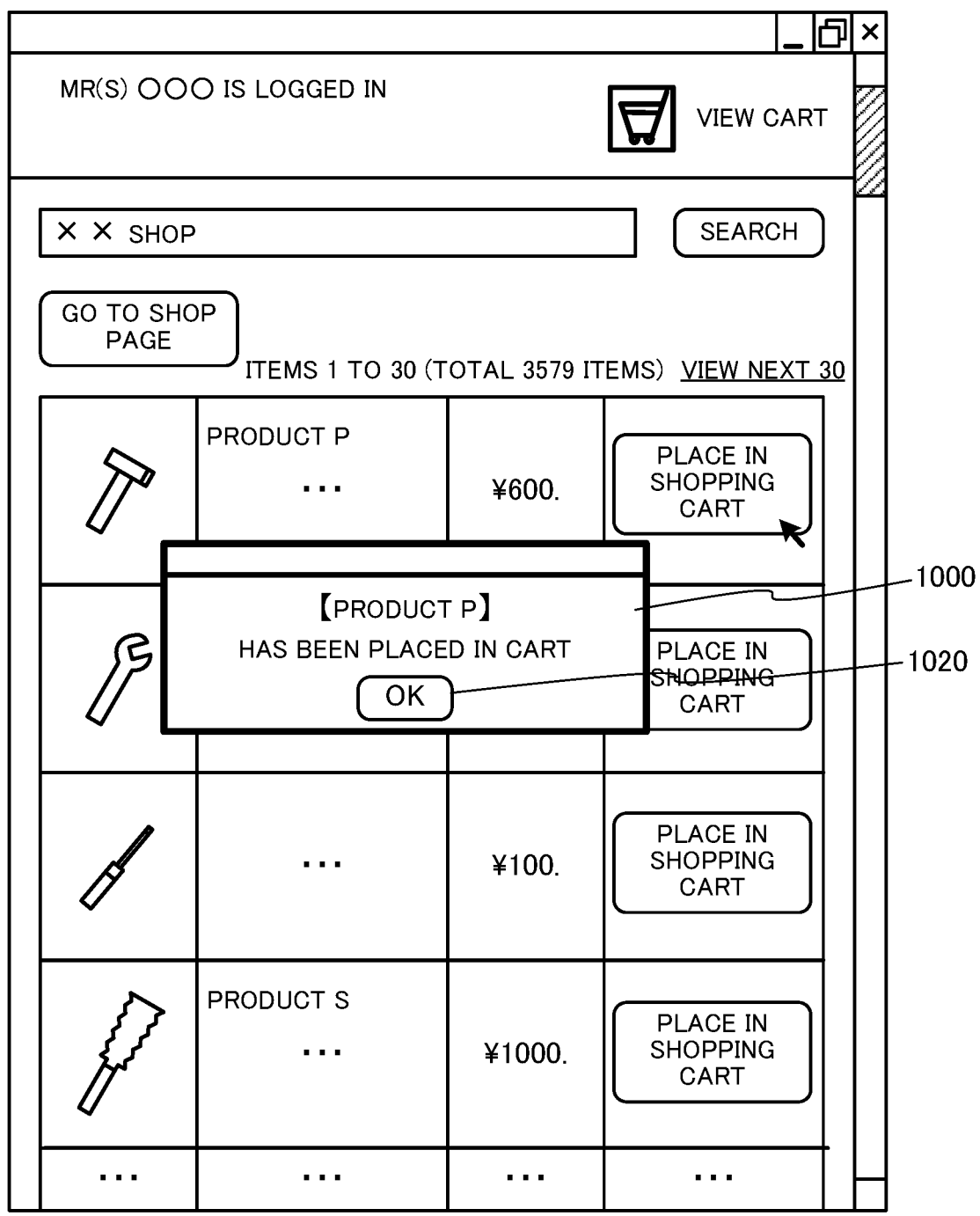
FIG. 10 is a drawing showing an example of an insertion notification.

FIG. 10 shows an example of an insertion notification 1000. The controller 507 of the electronic transaction terminal 20 displays a popup screen indicating the insertion notification 1000, while still displaying the product page. The insertion notification 1000 according to this exemplary embodiment is a dialog box including information indicating that the product was registered in the purchase list and a button 1020 promoting confirmation by the customer.

When the button 1020 is manipulated, the controller 507 of the electronic transaction terminal 20 erases the insertion notification 1000 and continues to display the product page. The customer can continue shopping after registering the product in the purchase list and confirming the insertion notification 1000. If the transition condition is not satisfied, the transition to the purchase page is not made each time the customer registers a product in the purchase list.

When an instruction (the second instruction) selecting another product differing from the products already registered in the purchase list is input while the product page is displayed, the controller 507 of the electronic transaction terminal 20 transitions to a product page showing the other product corresponding to the second instruction.

The second instruction may be an instruction for selecting the same product as a product already registered in the purchase list. In this case, the controller 507 of the electronic transaction terminal 20 redundantly registers the same product in the purchase list. The controller 507 may display a message or image indicating that the same product is registered in the purchase list.

After a predetermined reference time has elapsed from the start of displaying the insertion notification 1000, the controller 507 of the electronic transaction terminal 20 may automatically erase the insertion notification 1000. In this case, it would be fine to do away with the button 1020.

Or, when the button 1020 has not been manipulated during the time from the start of displaying the insertion notification 1000 until a predetermined reference time has elapsed, the controller 507 of the electronic transaction terminal 20 may automatically erase the insertion notification 1000.

Figure 11:
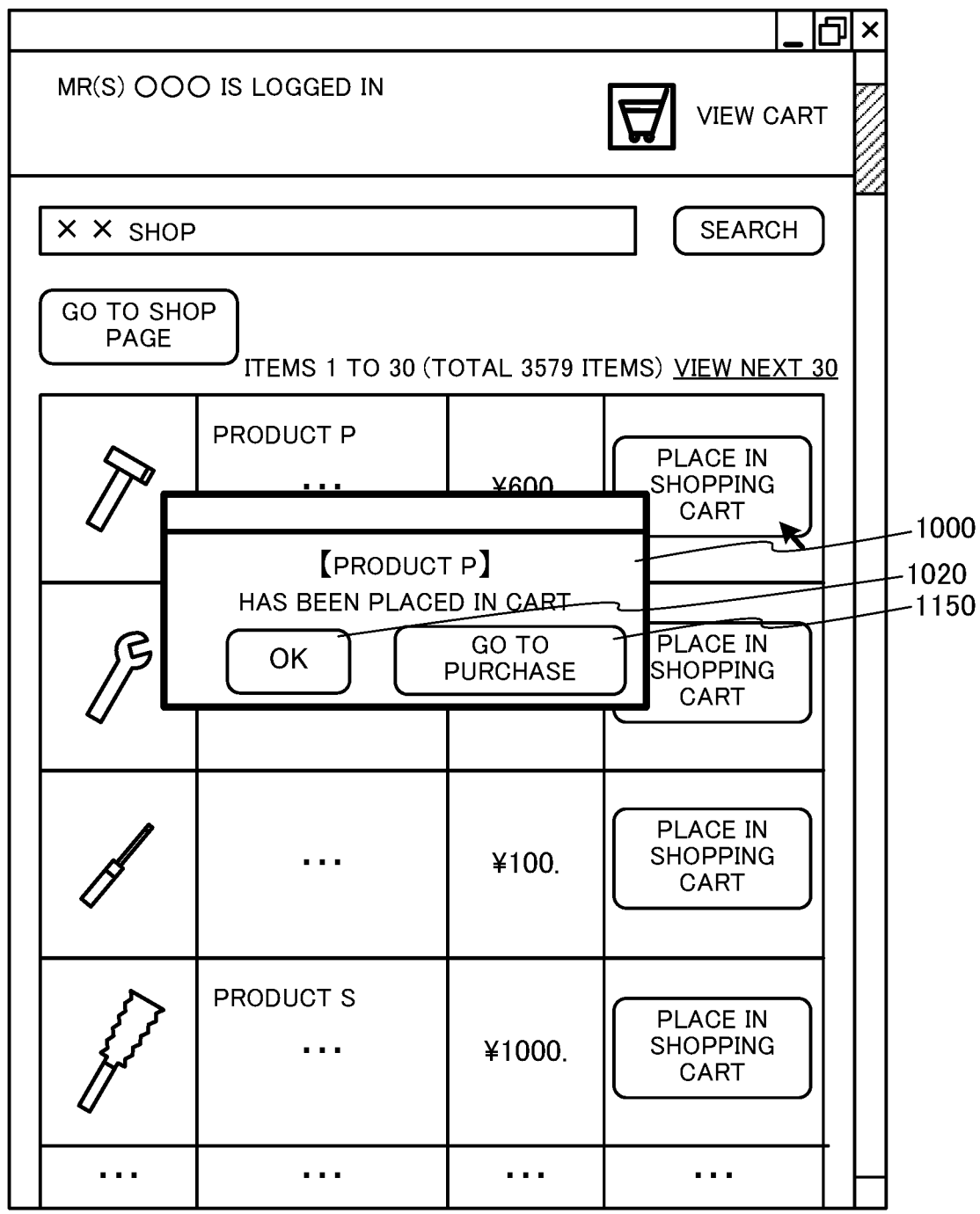
FIG. 11 is a drawing showing another example of an insertion notification.

FIG. 11 shows another example of the insertion notification 1000. The controller 507 of the electronic transaction terminal 20 may display, in addition to the button 1020, a button 1150 instructing to proceed to purchase procedures for the products registered in the purchase list.

When the button 1150 is manipulated, the controller 507 of the electronic transaction terminal 20 erases the insertion notification 1000 and transitions from the product page to the purchase page shown in FIG. 9.

When the button 1020 is manipulated, the controller 507 of the electronic transaction terminal 20 erases the insertion notification 1000 and continues to display the product page. Because the product page is still displayed, the customer can continue shopping without change.

When the customer wants to browse the purchase list after the insertion notification 1000 has been erased, or wants to start procedures to purchase products after the insertion notification 1000 has been erased, it would be fine to cause the purchase page to be displayed when the cart icon 730 is manipulated.

Next, the flow of an electronic transaction process executed by the electronic transaction system 1 is described with reference to the flowchart in FIG. 12.

First, when the first instruction selecting a product is received from the customer, the controller 507 of the electronic transaction terminal 20 acquires from the electronic transaction server 10 data comprising a product page showing that product, and displays the product page, for example as shown in FIG. 7 or FIG. 8 (step S1201).

The controller 507 of the electronic transaction terminal 20 determines whether or not the insertion object 710 has been manipulated by the customer (step S1202).

When the insertion object 710 has not been manipulated by the customer (step S1202: No), the controller 507 of the electronic transaction terminal 20 continues to display the product page. When a request to browse another page differing from the product page being displayed is input, for example when an instruction for a new search is input, the controller 507 of the electronic transaction terminal 20 acquires and displays data comprising the other page, from the electronic transaction server 10.

When the insertion object 710 has been manipulated by the customer (step S1202: Yes), the controller 507 of the electronic transaction terminal 20 determines whether or not the transition condition is satisfied (step S1203).

When it is determined that the transition condition is not satisfied (step S1203: No), the controller 507 of the electronic transaction terminal 20 displays the insertion notification 1000 while still displaying the product page displayed in step S1201 (step S1204).

The controller 507 of the electronic transaction terminal 20 determines whether or not the second instruction selecting another product differing from the insertion object 710 determined to be manipulated in step S1202 was input, in other words whether or not another product was selected (step S1205).

When it is determined that another product has been selected (step S1205: Yes), the controller 507 of the electronic transaction terminal 20 returns to step S1201, and acquires and displays a product page showing the selected other product.

When it is determined that another product has not been selected (step S1205: No), the controller 507 of the electronic transaction terminal 20 determines whether or not the cart icon 730 has been manipulated by the customer (step S1206).

When it is determined that the cart icon 730 has not been manipulated by the customer (step S1206: No), the controller 507 of the electronic transaction terminal 20 returns to the process of step S1205.

When it is determined that the cart icon 730 has been manipulated by the customer (step S1206: Yes), the controller 507 of the electronic transaction terminal 20 transitions from the product page displayed in step S1201, to the purchase page (step S1207).

When the purchase object 910 is manipulated by the customer, the controller 507 of the electronic transaction terminal 20 links with the electronic transaction server 10 and executes a payment process (step S1208). If the payment process concludes, the store is notified of conclusion of payment and a responsible party at the store ships the product to the customer.

When it is determined in step S1203 that the transition condition has been satisfied (step S1203: Yes), the controller 507 of the electronic transaction terminal 20 immediately transitions from the product page to the purchase page (step S1207), and when the purchase object 910 is manipulated by the customer, the payment process is executed (step S1208).

After the transition has been made from the product page to the purchase page in step S1207, when an instruction to halt the payment process is input from the customer, the controller 507 of the electronic transaction terminal 20 ends the electronic transaction process without accomplishing the payment process. When the first instruction selecting a product is received from the customer, the controller 507 of the electronic transaction terminal 20 again starts the electronic transaction process from step S1201.

With this exemplary embodiment, the electronic transaction system 1 can realize an environment in which a customer can easily shop. For example, when the customer has interest in a plurality of products on the same page, when a transition is made to another page such as the purchase page and/or the like after one product has been registered in the purchase list, the customer must return to the page prior to placing that product on the purchase list and continue shopping, or must return again to the top page and conduct another search, which is very troublesome. However, with this exemplary embodiment, when there are products with a high tendency to be purchased together on a single product page, the insertion notification 1000 is displayed but a transition from the product page to another page is not made, so the customer can easily continue shopping.

In addition, to the store, it is possible to reduce the risk that the customer leaves the product in the purchase list without making a purchase, and for customers to be taken away by other stores. For example, in a case in which a plurality of competing products are displayed on a single page, after the customer has registered a first product in the purchase list, when a competing second product continues to be displayed, the customer could rethink, stop the purchase of the first product registered in the purchase list and instead purchase the second product, so to the store selling the first product, there is an increased risk that a sales opportunity will be lost. However, with the exemplary embodiment, when there are no products with a tendency to be purchased together on a single product page, the transition from the product page to the purchase page is made promptly, so it is possible to provide an environment in which the customer does not waver. In addition, the efficacy of preventing the customer from leaving a product registered in the purchase list is increased.

The present disclosure is not limited by the foregoing specific embodiments, for various changes and modification are possible. In addition, it is possible to freely combine the constituent elements of the foregoing specific embodiments.

The insertion notification 1000 shown in FIG. 10 and FIG. 11 is displayed in a dialog box including the button 1020 for promoting confirmation by the customer. However, the controller 507 of the electronic transaction terminal 20 may display a message to the effect that the product has been registered in the purchase list, as the insertion notification 1000, and not display the button 1020. In this case, the controller 507 of the electronic transaction terminal 20 automatically erases the display of the insertion notification 1000 when a reference time has elapsed from the start of displaying the insertion notification 1000.

The position in the screen where the insertion notification 1000 is displayed, the design of the insertion notification 1000 and the length of time during which the insertion notification 1000 is continuously displayed are all arbitrary.

The controller 507 of the electronic transaction terminal 20 may also vary the length of time during which the insertion notification 1000 is displayed.

That is to say, in a state in which not even a single product has been registered in the purchase list, when the insertion object 710 associated with a given product is manipulated by the customer and the transition condition is not satisfied, the controller 507 sets the upper limit of the length of time for displaying the insertion notification 1000 to a first length, and displays the insertion notification 1000. If the button 1020 in the display of the insertion notification 1000 is manipulated by the customer, the controller 507 erases the display of the insertion notification 1000 even if the first length of time from the start of displaying the insertion notification 1000 has not elapsed.

On the other hand, in a state in which one or more products is already registered in the purchase list, when the insertion object 710 associated with another product is manipulated by the customer and the transition condition is not satisfied, the controller 507 sets the upper limit of the length of time for displaying the insertion notification 1000 to a second length shorter than the first length, and displays the insertion notification 1000. If the button 1020 in the display of the insertion notification 1000 is manipulated by the customer, the controller 507 erases the display of the insertion notification 1000 even if the second length of time from the start of displaying the insertion notification 1000 has not elapsed.

In addition, it would be fine for the controller 507 of the electronic transaction terminal 20 to set the maximum value of the length of time for displaying the insertion notification 1000 shorter the larger the number of products already registered in the purchase list is. A customer who has registered a plurality of products in the purchase list is thought to have high purchase interest, so even if the time for displaying that the product has been registered in the purchase list is short, it is thought that the customer is strongly aware that products were registered in the purchase list. Shortening the display time of the insertion notification 1000 makes it easier to browse the product page, if only a little.

It would also be fine to store and distribute a program for causing a computer to operate as all or a portion of the electronic transaction system 1 on a non-transitory computer-readable recording medium such as a memory card, compact disc (CD), digital versatile disk (DVD), magneto-optical disk (MO) and/or the like, to install this program on a different computer and cause the computer to act as the foregoing means, or cause the foregoing procedures to be executed.

Furthermore, it would be fine to store the program on a disk device and/or the like possessed by a server device on the Internet, and for example to download the program to a computer by overlaying the program on carrier waves.

With the present disclosure, it is possible to realize an environment in which a customer can shop easily.

REFERENCE SIGNS LIST

1 Electronic transaction system
10 Electronic transaction server
20, 20A, 20B, 20C Electronic transaction terminal
50 Communication network
201 Memory
202 Communicator
203 Controller
251 Product database
252 Purchase history database
501 Communicator
502 Image processor
503 Audio processor
504 I/O device
505 Input device
506 Memory
507 Controller
551 Display
552 Speaker
601 Presenter
602 Receiver
603 Inserter
700 Cursor
710, 710A, 710B, 710C, 710D, 710E, 710F, 710G, 710H Insertion object
720, 720A, 720B, 720C, 720D Store object
730 Cart icon
910 Purchase object
920, 930, 940 Button
1000 Insertion notification
1020, 1150 Button

The invention claimed is:

1. An electronic transaction terminal including a processor and a memory which stores a program executable for the processor, the program comprising:
a presenting code that causes the processor to present a customer a product page on which products and insertion objects associated with the products respectively are posted;
a receiving code that causes the processor to receive instructions from the customer; and
an inserting code that causes the processor to add, when a first instruction selecting an insertion object among the insertion objects and a product associated with the selected insertion object is received, the selected product to an electronic cart of the customer;
wherein when the product is added to the electronic cart:

(a) if a transition condition is satisfied, the processor causes the product page to transition to a purchase page starting payment for purchasing products already added to the electronic cart; and (b) if the transition condition is not satisfied, the processor presents an insertion notification along with the product page, the insertion notification indicating that the product displayed on the product page has been added to the electronic cart, and the processor continues to present the product page until a second instruction requesting another page differing from the product page is received from the customer, and then causes the product page to transition to the requested another page.

2. The electronic transaction terminal according to claim 1, wherein the processor determines that the transition condition is satisfied if, out of the other products posted on the product page, the number or ratio of related products belonging to the same category as the product associated with the selected insertion object is large on the basis of a prescribed standard.

3. The electronic transaction terminal according to claim 1, wherein the processor determines that the transition condition is satisfied if the number of other products purchased in the past along with the product associated with the selected insertion object, or the frequency with which other products have been purchased along with the product associated with the selected insertion object, is small on the basis of a prescribed standard.

4. The electronic transaction terminal according to claim 1, wherein the processor determines that the transition condition is satisfied if a product added to the electronic cart is a designated product specified in advance by a merchant.

5. The electronic transaction terminal according to claim 1, wherein:

the insertion notification is presented to the customer along with a purchase object; and when the purchase object is selected through the instruction received, the processor erases the display of the insertion notification and causes the page that should be presented to the customer to transition from the product page to the purchase page.

6. The electronic transaction terminal according to claim 1, wherein the processor erases the display of the insertion notification when a standard time has elapsed from the start of the display of the insertion notification.

7. The electronic transaction terminal according to claim 1, wherein when the product is added to the electronic cart in a state in which no products have been added to the electronic cart, the processor displays the insertion notification with a first length of time as an upper limit, and when the product is added to the electronic cart in a state in which at least one product has been added to the electronic cart, the processor displays the insertion notification with a second length of time that is shorter than the first time as an upper limit.

8. The electronic transaction terminal according to claim 1, wherein the processor sets an upper limit of the length of time for displaying the notification that is shorter the larger the number of products that have been added to the electronic cart.

9. An electronic transaction method comprising:

presenting to a customer a product page on which products and insertion objects associated with the products respectively are posted;

receiving instructions from the customer; and adding, when a first instruction selecting an insertion object among the insertion objects and a product associated with the selected insertion object is received, the selected product to an electronic cart of the customer;

wherein when the product is inserted into added to the electronic cart:

(a) if a transition condition is satisfied, the product page transitions to a purchase page starting payment for purchasing products already added to the electronic cart; and (b) if the transition condition is not satisfied, an insertion notification is presented along with the product page, the insertion notification indicating that the product displayed on the product page has been added to the electronic cart, and the product page is continued to present until a second instruction requesting another page differing from the product page is received from the customer, and then causes the page that is presented to the customer to transition from the product page to the requested another page.

10. A non-transitory computer-readable recording medium on which is stored a program that causes a computer to function as:

a presenter for presenting to a customer a product page on which products and insertion objects associated with the products respectively are posted;

a receiver for receiving instructions from the customer; and an inserter for adding, when a first instruction selecting an insertion object among the insertion objects and a product associated with the selected insertion object is received, the selected product to an electronic cart of the customer;

wherein when the product is added to the electronic cart:

(a) if a transition condition is satisfied, the presenter causes the product page to transition to a purchase page starting payment for purchasing products already added to the electronic cart; and (b) if the transition condition is not satisfied, the presenter presents an insertion notification along with the product page, the insertion notification indicating that the product displayed on the product page has been added to the electronic cart, and the presenter continues to present the product page until a second instruction requesting another page differing from the product page is received from the customer, and then causes the product page to transition to the requested another page.

\* \* \* \* \*